Jan. 8, 1963
W. A. HASBANY
3,072,149
DETENT FOR VALVE PLUNGERS
Filed Nov. 15, 1960
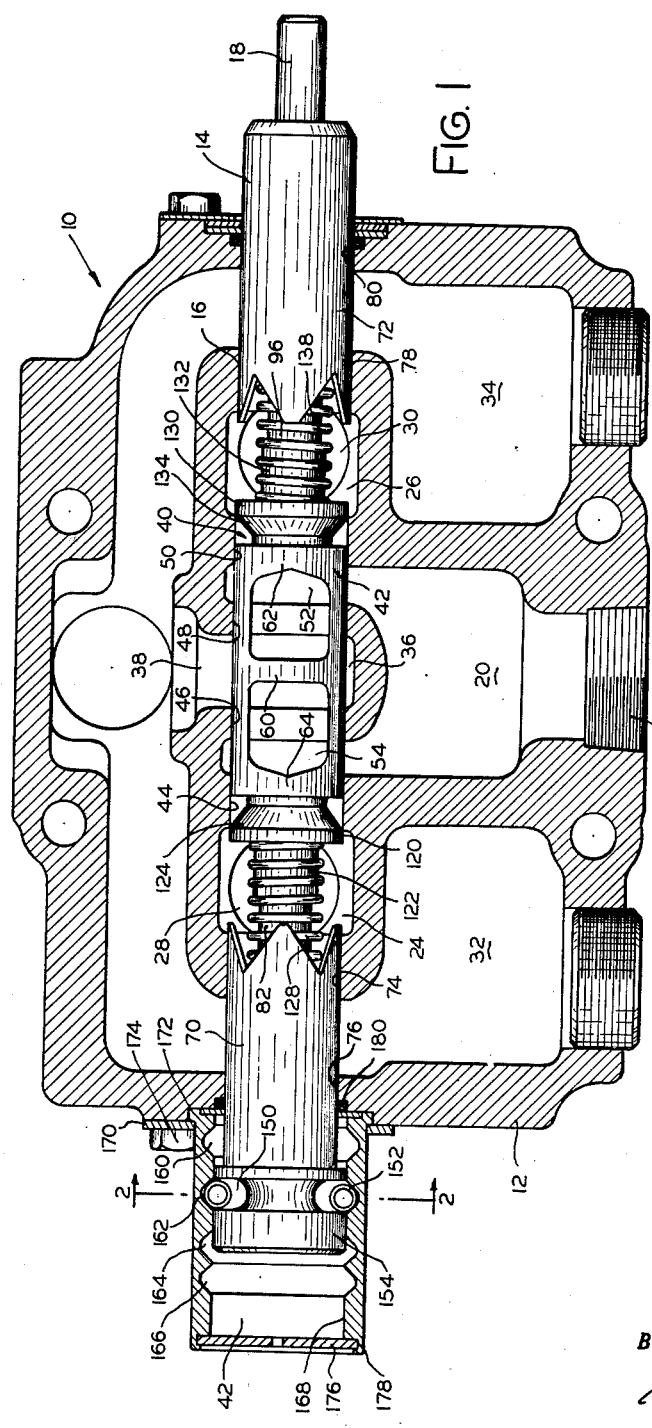
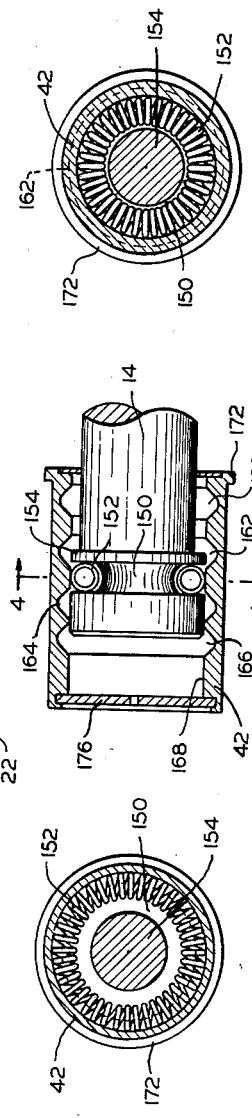
*INVENTOR.*
WOODROW A. HASBANY
BY
ATTORNEY

United States Patent Office 3,072,149
Patented Jan. 8, 1963

3,072,149
DETENT FOR VALVE PLUNGERS
Woodrow A. Hasbany, South Bend, Ind., assignor to Clark Equipment Company, a corporation of Michigan
Filed Nov. 15, 1960, Ser. No. 69,362
4 Claims. (Cl. 137—622.5)

The present invention relates to detents, and more particularly to a detent mechanism for retaining shafts, rods, plungers and the like, including spools of hydraulic control valves.

The detent normally incorporated in conventional spool type hydraulic control valves for retaining the spool in selected operating positions consists generally of a series of annular grooves in the spool near one end thereof, or in the wall of the valve body or cap surrounding the spool, and one or more radially movable steel balls, each seating in the annular grooves and being urged into firm contact with the walls forming the grooves by a coil spring. While this type of detent mechanism is extensively used in the hydraulic valve field, it has certain inherent disadvantages, including excess wear on the wall forming the grooves resulting from the high unit pressure applied by each individual ball, intricate machining operations in obtaining the desired location of the ball and spring in the spool or valve body, and a time consuming operation of assembling a number of small parts in difficult to reach locations during fabrication of the valve and in servicing the valves in the field. It is therefore one of the principal objects of the present invention to provide a relatively simple, inexpensive detent mechanism for retaining the spool elements of hydraulic valves in preselected positions, which consists of only one part separate from the spool and surrounding valve structure and which can readily be assembled in position on the spool and the spool assembled in the bore in the valve body and cap without any interference from the premounted separate detent part.

Another object of the invention is to provide a detent mechanism for a shaft, rod, plunger or similar member longitudinally movable in or through a body having a bore for the member, in which an annular detent element seats in a series of annular grooves in the body and bears uniformly on the circumferential walls defining the grooves, thereby distributing the retaining pressures over a relatively large area, reducing wear and giving maximum reliability over long periods of time without service or adjustments being required.

Still another object of the invention is to provide a compact durable detent mechanism of the aforesaid type which avoids high unit pressure at any one point or series of separate points, and which permits the retained member to be moved with substantially the same applied force consistently between the several preselected fixed positions.

A further object is to provide a detent mechanism for retaining a longitudinally movable shaft, rod or similar member in various preselected positions, which holds the shaft firmly in any one of the preselected positions and which in effect substantially releases the movable member as soon as movement from one position has been initiated and until the next preselected position has been reached.

Additional objects and advantages of the present invention will become apparent from the following description and accompanying drawings, wherein:

FIGURE 1 is a longitudinal cross sectional view of a spool type valve having incorporated therein the present detent mechanism, details of the valve mechanism being shown to fully illustrate the operation of the detent;

FIGURE 2 is a cross sectional view of the detent mechanism taken on line 2—2 of FIGURE 1;

FIGURE 3 is a fragmentary cross sectional view of the valve shown in FIGURE 1 with the plunger of the valve being shifted to an intermediate position to illustrate the operation of the present detent mechanism; and FIGURE 4 is a cross sectional view similar to FIGURE 2, taken on line 4—4 of FIGURE 3, with the valve plunger shifted to the position shown in FIGURE 3.

Referring more specifically to the drawings, numeral 10 designates an open center, 4-way double-acting spool valve having a housing 12 and a plunger 14 seated in longitudinal bore 16 in the housing and having an extension 18 on one end thereof for connecting the plunger to either a manually or power operated actuating lever. The valve shown in FIGURE 1 is a single plunger type suitable for use in a variety of different types of hydraulic systems, the one shown being designed primarily for controlling a double acting hydraulic work cylinder (not shown) of well known construction in a system having a reservoir and a positive displacement pump for supplying hydraulic fluid from the reservoir to the valve and thence through lines to either end of the cylinder. The pump is continuously operating and the fluid from the pump is returned directly to the reservoir while the valve plunger is in its neutral position shown in FIGURE 1. The hydraulic system and the components thereof, aside from the valve, form no part of the present invention and will not be described herein.

The housing 12 of the valve contains a chamber 20 connected through inlet opening 22 with the outlet of the fluid supply pump and, through bore 16 and outlet chambers 24 and 26, with openings 28 and 30, respectively, the latter openings being connected by conduits (not shown) with opposite ends of the hydraulic cylinder. Chambers 24 and 26 are also connected to the reservoir through the bore, return chambers 32 and 34 and return conduits (not shown). Chamber 20 is also connected through return recirculation chamber 36 and opening 38 with a conduit (not shown) leading to the reservoir for returning the hydraulic fluid to its source while plunger 14 is in its neutral position and the hydraulic cylinder is inoperative and in the hold position. The present detent mechanism indicated by numeral 40 retains plunger 14 in various selected operating positions and may be incorporated as part of the main body portion of the valve or in a detachable cap 42 as illustrated in FIGURE 1. The housing 12 is constructed of cast iron or other suitable material with chambers 20, 24 and 26 being cored therein and bore 16 drilled or otherwise machined.

Plunger 14 briefly consists of a central cylindrical member 40 having an enlarged portion 42 slidably engaging the walls of bore 16 at lands 44, 46, 48 and 50 and containing openings 52 and 54 on the right and left sides of the center, as viewed in FIGURE 1. The openings on the right side are separated from those on the left side by a central partition 60 which, together with end partitions 62 and 64, in effect forms three separate lands on portion 42 cooperating with the lands of the bore to control the flow of fluid from chamber 20 through chamber 36 and opening 38 to the return line to the reservoir while the valve is in its neutral position, and to control the flow from chamber 20 to either chambers 24 and 26 and their respective lines to the hydraulic cylinder when the plunger is moved to the right or left. If the plunger is shifted to the right, for example, lands 60 and 64 cooperating with lands 48 and 46 of the bore interrupt the flow of fluid into chamber 36.

The flow of fluid through chambers 24 and 26 either to the respective ends of the hydraulic cylinder or to chambers 32 and 34 and thence to the reservoir, is controlled by cylindrical end members 70 and 72, the former being in slidable engagement with bore lands 74 and 76 and spanning chamber 32, and the latter being in slidable engagement with bore lands 78 and 80 and spanning chamber 34. Member 70 is connected to central member 40 by a stem 82 which is axially aligned and preferably formed integrally with portion 42 and which extends into an axial recess in he inner end of member 70. The stem and member are held permanently together once they have been assembled by a snap ring seated in an annular groove in the stem and an annular groove in the inner wall of the recess. Member 72 is connected to member 40 with a similar structure consisting of a stem 96 seating in a recess and being locked therein by a snap ring seating in annular grooves in stem 96 and member 72. The inner ends of members 70 and 72 contain deep V-notches which effectively meter the fluid when the members are moved toward open position to relieve the fluid in the respective end of the hydraulic cylinder. Mounted on stem 82 is a second stage or plunger valve 120, consisting of a cylindrical stem 122 and frustoconically shaped valve element 124 joined integrally with stem 122 and urged into sliding engagement with bore land 44 by a coil spring 128 on said stems reacting against the back side of valve element 124 and the inner end of plunger member 70. A similar plunger valve 130 is mounted on stem 96, consisting of a cylindrical stem 132 and a frustoconically shaped valve element 134 joined integrally to the valve stem and urged into sliding engagement with bore land 50 by a coil spring 138 on stems 96 and 132 and reacting against the back side of valve element 134 and the inner end of plunger member 72. When the valve plunger is in its neutral-hold position, as shown in FIGURE 1, valve elements 124 and 134 are in bore lands 44 and 50 and are seated on partitions 64 and 62, respectively. As the plunger is moved to the right, for example, partition 64 moves from bore land 44, exposing valve element 124 to the fluid pressure in chamber 20. The fluid pressure is sufficient to overcome the force of spring 128 and forces the element to the left sufficiently to establish communication between chambers 20 and 24, the plunger valve having effectively dammed fluid in the cylinder and prevented the back-flow tendency of the fluid until the pump pressure has increased sufficiently to overcome the cylinder back pressure. The plunger valve prevents load drop and hence provides an effective take-away lift mechanism. The foregoing spool and plunger valve construction is fully described and claimed in my copending application Serial No. 19,874, filed April 4, 1960, and will not be further described herein.

In the form of the present detent mechanism shown in the drawings, a deep annular groove 150 is provided in plunger 14 near the end thereof and a garter spring 152 is mounted in the groove, the internal diameter of spring 152 being normally smaller than the external diameter of the adjacent plunger portion 154 and the external diameter of the spring being larger than the adjacent plunger portion. Plunger portion 154 may be formed integrally with the remainder of the plunger, or it may be fabricated as a separate unit and attached to the plunger by any suitable means, such as by a screw extending longitudinally therethrough into the main portion of the plunger. Spring 152 in its fully expanded position, i.e. not under compression or expansion forces, is preferably exposed beyond the periphery of plunger portion 154 by at least the full outer half of the spring, and the convolutions thereof are spaced sufficiently apart that the spring may be contracted fully into groove 150 before the convolutions contact one another laterally, so that the external portion of the spring is on a plane with the external surface of plunger portion 154.

Spring 152 cooperates with a series of annular grooves 160, 162, 164 and 166 in the internal wall of cap 42, the cap having a cylindrical bore 168 substantially the same diameter as cylindrical portion 154 of the plunger to permit the cylindrical portion to shift axially the full length of the cap. The cap is secured to the end of the valve housing by a retainer ring 170 seating over a flange 172 on the inner end of cap 42 and being held rigidly in place by a plurality of bolts 174 extending through said ring and into the adjacent valve housing. Cap 42 is closed at its outer end by a disc shaped member 176 seated in groove 178 of the cap and is sealed at its inner end around plunger 14 by an O-ring gasket 180.

In the operation of the present detent mechanism, movement of plunger 14 longitudinally within the valve bore causes spring 152 to contract into groove 150 as shown in FIGURES 3 and 4 and move with plunger portion 154 along the internal surface of cap 42 to the next annular groove in the internal wall of the cap. During the movement of the spring from one groove to another the convolutions of the spring tend to roll in groove 150 and along the internal surface of the cap, thus minimizing friction and other extraneous forces from the positioning operation after the initial movement of the plunger. As shown in the drawings, while being shifted from one detent groove to the next, for example from groove 160 to groove 164, spring 152 is fully contracted into groove 150. After the next succeeding groove is reached, the spring immediately expands into the groove, in effect latching and retaining the plunger in its new position.

With reference to the operation of the detent mechanism in conjunction with the valve, spring 152 is seated in detent groove 162 when plunger 14 is in its neutral position, as shown in FIGURE 1 of the drawings. Movement of the plunger to the right connects chamber 20 with chamber 24, as soon as the pressure differential between the two chambers is sufficient to move plunger valve 120 to the left and admit fluid from chamber 20 to chamber 24 and thence through opening 28 to one end of the hydraulic cylinder. Movement of the plunger in the foregoing direction also interrupts communication between chambers 20 and 36 and connects chambers 30 and 34, completing the circuit between the opposite end of the hydraulic cylinder and the fluid reservoir. The plunger is retained in this position by the seating of spring 152 in annular detent groove 160. Movement of plunger 14 to the left connects chamber 20 with chamber 26, as soon as the pressure differential between the two chambers is sufficient to move plunger valve 130 to the right and admit fluid from chamber 20 to chamber 26, and thence through opening 30 to the opposite end of the hydraulic cylinder. When the plunger is in this position, communication between chambers 20 and 36 is interrupted and chambers 24 and 32 are connected, completing the circuit between the other end of the hydraulic cylinder and the fluid reservoir. With the plunger in this position, spring 152 is seated in groove 164 and removably retains the plunger in the foregoing operating position. Further movement of the plunger to the left places the plunger in position for floating, no-load operation of the hydraulic cylinder, and seats spring 152 in groove 166 thereby removably retaining the plunger in the latter position until the operator shifts the plunger to one of the previously described positions.

While the present detent mechanism is particularly adapted for use in conjunction with spool valves, it can be readily adapted to a variety of other uses in which it is desired to retain a longitudinally movable shaft, rod, plunger or like member in various preselected positions. The mechanism may have a greater or smaller number of detent grooves to satisfy various installation requirements. Other modifications and changes may be made in the detent mechanism without departing from the scope of the present invention.

I claim:

1. In a spool valve having a housing containing a cylindrical bore with a longitudinally movable cylindrical plunger therein: a detent mechanism for releasably retaining said plunger in preselected longitudinal positions, comprising a cylindrical section of substantially the same diameter as said bore formed integrally with one end of said plunger and having a deep annular groove therein, and an annular-shaped coil spring in said groove projecting outwardly therefrom throughout its circumference and being compressible fully into said groove, the wall of said housing defining the bore along said section having a plurality of annular grooves spaced longitudinally along said wall for receiving said spring when said plunger is moved longitudinally to the position at which said first mentioned groove registers therewith, the annular grooves in the wall of said housing being of the same width as the groove in said plunger.

2. In a spool valve having a housing containing a bore and a longitudinally movable plunger therein: a detent mechanism for releasably retaining said plunger in a preselected position, comprising a cylindrical section of substantially the same diameter as said bore joined to one end of said plunger and having a circumferential groove therein, and an annular-shaped coil spring in said groove projecting outwardly therefrom throughout its circumference and being compressible fully into said groove, the wall of said housing defining the bore along said section having an annular groove for receiving said spring when said plunger is moved longitudinally to the position at which said first mentioned groove registers therewith, the annular groove in the wall of said housing being of substantially the same width as the groove in said plunger.

3. In a spool valve having a housing containing a bore and a longitudinally movable plunger extending through and beyond said bore and a cap with a cylindrical recess therein on the protruding end of said plunger: a detent mechanism for releasably retaining said plunger in preselected longitudinal positions, comprising a cylindrical section in said cap of substantially the same diameter as said cylindrical recess formed integrally with one end of said plunger and having an annular groove therein, and a garter spring in said groove projecting outwardly therefrom throughout its circumference and being compressible fully into said groove, the internal wall of said cap surrounding the protruding end of said plunger having a plurality of grooves of substantially the same width as the groove in said plunger spaced longitudinally along said wall for receiving said spring when said plunger is moved longitudinally to the position at which said first mentioned groove registers therewith.

4. In a spool valve having a housing containing a bore with a longitudinally movable plunger therein extending beyond said bore and a cap with a cylindrical recess therein on the protruding end of said plunger: a detent mechanism for releasably retaining said plunger in a preselected position, including a section substantially the same size as the recess in said cap joined to one end of said plunger and having a circumferential groove therein, and a garter spring in said groove projecting outwardly therefrom throughout its circumference and being compressible fully into said groove, the internal wall of said cap surrounding the protruding end of said plunger having a groove of the same width as the groove in said plunger for receiving said spring when said plunger is moved longitudinally to the position at which said first mentioned groove registers therewith.

References Cited in the file of this patent

UNITED STATES PATENTS

| 2,775,260 | Drennen | Dec. 25, 1956 |

FOREIGN PATENTS

| 165,792 | Austria | Apr. 25, 1950 |
| 720,337 | France | Dec. 3, 1931 |